United States Patent
Wang (10) Patent No.: US 11,822,568 B2
(45) Date of Patent: Nov. 21, 2023

(54) DATA PROCESSING METHOD, ELECTRONIC EQUIPMENT AND STORAGE MEDIUM

(71) Applicant: BEIJING BAIDU NETCOM SCIENCE TECHNOLOGY CO., LTD., Beijing (CN)

(72) Inventor: Zhen Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/577,668

(22) Filed: Jan. 18, 2022

(65) Prior Publication Data
US 2022/0138217 A1 May 5, 2022

(30) Foreign Application Priority Data

Jan. 20, 2021 (CN) .......................... 202110078164.6

(51) Int. Cl.
*G06F 16/00* (2019.01)
*G06F 16/25* (2019.01)
*G06F 16/22* (2019.01)
*G06F 16/21* (2019.01)
*G06F 16/215* (2019.01)
*G06F 16/23* (2019.01)

(52) U.S. Cl.
CPC .......... *G06F 16/254* (2019.01); *G06F 16/215* (2019.01); *G06F 16/219* (2019.01); *G06F 16/2237* (2019.01); *G06F 16/2365* (2019.01)

(58) Field of Classification Search
USPC ........................................................ 707/602
See application file for complete search history.

(56) References Cited

U.S. PATENT DOCUMENTS

| 8,326,353 B1* | 12/2012 | Nasserbakht ......... G06F 3/0643 455/566 |
| 2019/0121995 A1* | 4/2019 | Niu ..................... H04L 67/1095 |
| 2022/0300502 A1* | 9/2022 | Enver ................. G06F 16/2465 |

FOREIGN PATENT DOCUMENTS

| CN | 111382296 A | 7/2020 |
| CN | 111488489 A | 8/2020 |
| CN | 111881315 A | 11/2020 |

OTHER PUBLICATIONS

Tang et al., "Image Information Input Method, Electronic Device, and Computer Readable Storage Medium", Mar. 2021, (WO-2021258797-A1), 27 pages. (Year: 2021).*

(Continued)

*Primary Examiner* — Bai D Vu
(74) *Attorney, Agent, or Firm* — Maschoff Brennan (57) ABSTRACT

A data processing method, an electronic equipment, and a storage medium. The method includes: acquiring target data; performing a data segmentation on the target data by using a first micro-service to obtain a plurality of types of sub-data; using a plurality of second micro-services to process the plurality of types of sub-data to obtain a plurality of data processing results respectively corresponding to the plurality of second micro-services, in which each second micro-service corresponds to one type of sub-data; combining the plurality of data processing results to obtain a target data processing result.

14 Claims, 6 Drawing Sheets

(56) References Cited

OTHER PUBLICATIONS

CN Office Action in Application No. 202110078164.6 dated Apr. 25, 2022.
Search Report for EP Application No. 22152159.4 dated May 18, 2022.
"A data-centric approach to distributed tracing" 2019 IEEE International Conference on Cloud Computing Technology and Science, Dec. 11, 2019.
"MixedEmotions: An Open-Source Toolbox for Multi-Modal Emotion Analysis" IEEE Transactions On Multimedia, vol. XX, No. X, Jan. 2018.
"Pushing Participatory Sensing Further to the Edge" 2019 IEEE International Conference on Edge Computing, Jul. 8, 2019.

\* cited by examiner

DATA PROCESSING METHOD, ELECTRONIC EQUIPMENT AND STORAGE MEDIUM

CROSS-REFERENCE TO RELATED APPLICATIONS

This application claims the benefit of priority to Chinese Application No. 202110078164.6, filed on Jan. 20, 2021, the contents of which are incorporated herein by reference in their entirety.

FIELD

The present disclosure relates to the field of computer technology, in particular to the field of artificial intelligence technology such as deep learning, computer vision, cloud computing, and big data processing, and in particular to a data processing method, an electronic equipment and a storage medium.

BACKGROUND

Artificial intelligence (AI) is a subject that makes a computer to simulate some thinking processes and intelligent behaviors (such as learning, reasoning, thinking, planning, etc.) of a person, and both hardware technologies and software technologies are used. AI hardware technology generally includes a sensor, a dedicated artificial intelligence chip, cloud computing, distributed storage, big data processing, etc., AI software technology mainly includes computer visual technology, speech recognition technology, natural language processing technology, and machine learning, deep learning, big data processing technology, knowledge map technology, etc.

SUMMARY

A data processing method, an electronic equipment, a storage medium and a computer program are provided.

According to a first aspect of embodiments of the present disclosure, a data processing method is provided, and the method includes: acquiring target data; performing a data segmentation on the target data by using a first micro-service to obtain a plurality of types of sub-data; using a plurality of second micro-services to process the plurality of types of sub-data to obtain a plurality of data processing results respectively corresponding to the plurality of second micro-services, in which each second micro-service corresponds to one type of sub-data; and combining the plurality of data processing results to obtain a target data processing result.

According to a second aspect of embodiments of the present disclosure, an electronic equipment is provided, and the electronic equipment includes: at least one processor; a memory connected to the at least one processor; in which the memory stores instructions performed by the at least one processor, the instructions are performed by the at least one processor to implement the data processing method according to the embodiment of the present disclosure.

According to a third aspect of embodiments of the present disclosure, a non-transitory computer readable storage medium stored with computer instructions, in which the computer instruction is executed by the computer to implement the data processing method according to the embodiments of the present disclosure.

It should be understood that the contents described in summary are not intended to identify the key or important features of the embodiments of the present disclosure, and are not intended to limit the scope of the disclosure. Other features of the present disclosure will be readily understood by the following description.

BRIEF DESCRIPTION OF THE DRAWINGS

The drawings are used to better understand the present disclosure, and do not limit the scope of the disclosure.

DETAILED DESCRIPTION

The following describes exemplary embodiments of the present disclosure with reference to the accompanying drawings, which include various details of the embodiments of the present disclosure to facilitate understanding, and should be regarded as merely exemplary. Therefore, a person skilled in the art should recognize that various changes and modifications can be made to the embodiments described herein without departing from the scope and spirit of the present disclosure. Similarly, for clarity and conciseness, descriptions of well-known functions and structures are omitted in the following description Researching are typically implemented based on an artificial intelligence framework. An operator is a basic calculation unit in the artificial intelligence framework, and has an important impact on AI model training, forecasting and deployment. An AI model is used to process data. For example, a flow processing method, a Directed Acyclic Graph (DAG) distributed technology or a micro-servitization method is used to process audio and video data, which has become a research hotspot for data processing development.

Figure 1:
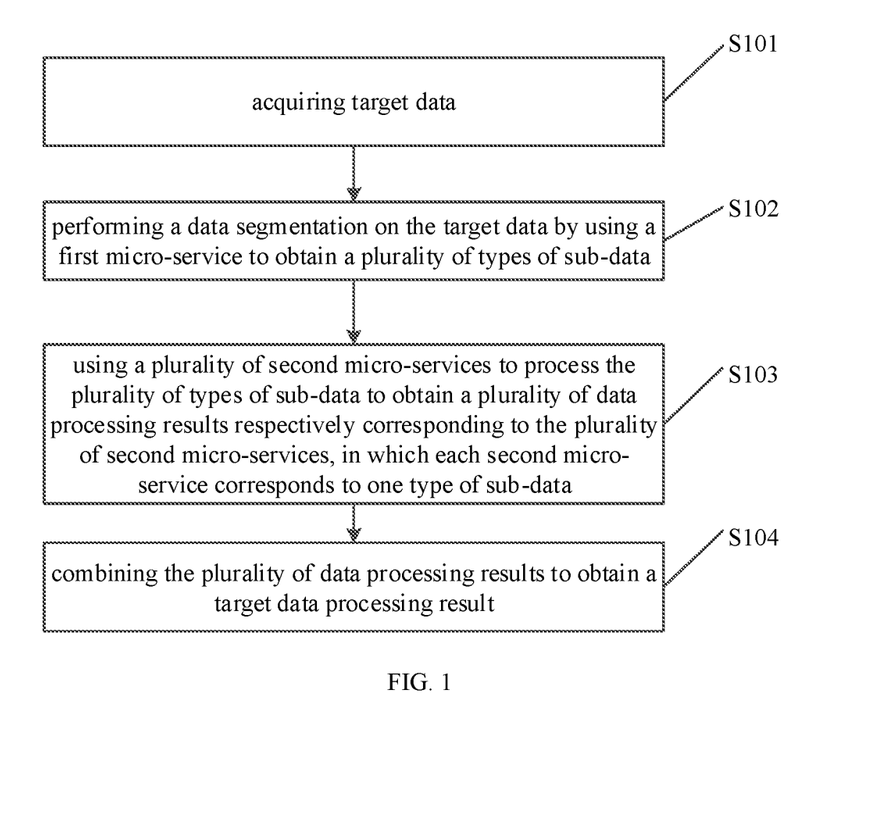
FIG. 1 is a flowchart of a data processing method according to a first embodiment of the present disclosure.

FIG. 1 is a schematic diagram of a first embodiment of the present disclosure.

It is to be noted that the execution body of the data processing method of the present embodiment is a data processing device, which can be implemented by software and/or hardware, can be configured in an electronic equipment. The electronic equipment includes a terminal, a server side, but is not limited herein.

Embodiments of the present disclosure relate to AI technologies such as deep learning, computer vision, cloud computing, and large data processing, etc., can be used in image processing scenarios.

AI is a new technological science that studies and develops theories, methods, technologies and application systems used to simulate, extend and expand human intelligence.

Deep learning is to learn the internal laws and representation levels of sample data. The information obtained in the learning process is of great help to the interpretation of data such as text, images and sounds. The ultimate goal of deep learning is to allow machines to have the analysis and learn ability like humans, and to recognize data such as text, images, and sounds.

Computer vision refers to use cameras and computers instead of human eyes to identify, track, and measure machine vision for a target, and further implement the image processing, so that the image processed by the computer becomes more suitable for human eyes to observe or send to the instrument for inspection.

Cloud computing refers to access an elastic and scalable shared physical or virtual resource pool through the network. Resources can include servers, operating systems, networks, software, applications, and storage devices, etc., and the resources can be deployed and managed on demand or in a self-service manner. The cloud computing technology can provide efficient and powerful data processing capabilities for AI technology applications, block chain technology applications and model training.

Big data processing refers to a process of analyzing and processing huge-scale data using AI technology, and big data can be summarized as 5V, large data volume (Volume), fast speed (Velocity), various types (Variety), Value, and Veracity.

As shown in FIG. 1, the data processing method includes the following steps.

S101: target data is acquired.

The target data can be data to be processed, such as a video, an audio, a document, or any other type of data.

In an embodiment of the present disclosure, the data processing device can be configured to provide a data entry interface to a user, and then the video data entered by the user is received on the data entry interface as target data, or a piece of text entered by the user can also be received, The piece of text is processed into a corresponding document, so that the document is used as the target data, or to-be-processed data sent by other electronic devices can also be received as the target data.

In order to better describe the data processing method and the implementation effect thereof in the embodiments of the present disclosure, for example, the target data may be massive video data, but is not limited therein.

In an embodiment of the present disclosure, for example, massive video data can be obtained from a shared physical or virtual resource pool and used as the target data. That is, in the embodiment of the present disclosure, data processing on the massive video data is supported. When the massive video data is used to train AI models (such as deep learning models or machine learning models, which is not limited herein), the data volume is usually very large, at this time, the massive video data can be directly acquired from the shared physical or virtual resource pool and used as the target data.

S102: a data segmentation is performed on the target data by using a first micro-service to obtain a plurality of types of sub-data.

The micro-service (or a micro-service architecture) is a cloud native architecture method, in which a single application consists of many loosely coupled and independently deployable small components or services, and the service usually has a corresponding stack, including database and data models, communicate is implement through a combination of event flows and message agent. Components and services can usually be organized according to business capabilities. The separation service line is usually called bounded contexts.

The micro-service for preprocessing target data to implement the data segmentation is called the first micro-service.

The first micro-service can be obtained by performing micro-servitization processing on some data preprocessing algorithms, or can be developed directly by software developers according to the data preprocessing requirements, or can be obtained by using some micro-service generation models, which is not limited herein.

Correspondingly, a micro-service used for implementing subsequent algorithmic processing on the target data (such as target recognition, face detection) can be called a second micro-service.

The second micro-service can also be obtained by performing micro-servitization processing on the algorithm processing logic of some data, or can be directly developed by software developers according to the data processing requirements, or can be obtained by using some micro-service generation models, which is not limited herein.

The "first" and "second" in the embodiments of the present disclosure are used to distinguish fields, and are not used as limitations on the possible implementation manners of the embodiments of the present disclosure.

In an embodiment of the present disclosure, the first micro-service is obtained by performing the micro-servitization processing on the first operator in the AI model, and the first operator may be an operator capable of preprocessing data in the AI model. The second micro-service is obtained by performing the micro-servitization processing on the second operator in the AI model. The first operator and the second operator are not the same, so that the algorithm processing logic in the AI model is integrated into the data processing process by the micro-servitization processing, which can realize the micro-servitization reuse of AI model operators, thereby effectively improving the accuracy and efficiency of data processing.

The above-mentioned AI model may be, for example, a machine learning model, a neural network model, and so on, which is not limited.

Some of the above concepts are explained as follows.

The micro-servitization processing in the embodiments of the present disclosure can be the transformation of the processing functions corresponding to the operators in the AI model into a corresponding micro-service. In the embodiments of the present disclosure, the first micro-service is obtained by performing the micro-servitization processing on the first operator in the AI model. The second micro-service is obtained by performing the micro-servitization processing on the second operator in the AI model. The first operator and the second operator are different.

An operator is a basic computing unit in the AI architecture, which has an important influence on the AI model training, prediction and deployment.

The definition of operators can be exemplified as follows.

The operator mainly includes three parts: Inputs, Outputs, and Attributes. One operator can have a plurality of inputs, outputs and attributes at the same time.

The first operator and the second operator are different operators in the AI model. For example, they may have different functions and different operation processing logics.

It is understandable that when the first micro-service is obtained by performing the micro-servitization processing on the first operator in the AI model, the first micro-service has the same algorithm processing logic as the first operator, and when the second micro-service is obtained by performing the micro-servitization processing on the second operator in the AI model, the second micro-service has the same algorithm processing logic as the second operator.

In an embodiment of the present disclosure, the first operator is an operator used for data preprocessing in the AI model, and the second operator is an operator used for algorithmic processing of preprocessed data in the AI model. In other words, the operator of the data preprocessing in the AI model is "stripped" to obtain the first operator, and the operator used for algorithmic processing of preprocessed data in the AI model is "stripped" to obtain the second operator.

The above-mentioned data preprocessing can, for example, denoise, filter, classify, and add tags to the target data, and the above-mentioned algorithmic processing of the preprocessed data can specifically implement face recognition, human body recognition, Optical Character Recognition (OCR) on the preprocessed target data after denoising, filtering, classifying, and adding tags, which is not limited herein.

That is, in the embodiment of the present disclosure, the operator of the data preprocessing in the AI model is "stripped" to obtain the first operator, and the operator used for algorithmic processing of preprocessed data in the AI model is "stripped" to obtain the second operator, which realizes the "stripping" of operators of the data preprocessing and the algorithm processing of the preprocessed data in the AI model, so that the processing logic corresponding to the operator can effectively adapt to big data processing technologies such as cloud computing, distributed, memory sharing. In the data processing process, operators with various algorithm functions can be effectively combined according to data processing requirements dynamically, so as to effectively improve the adaptability of the operators in the AI model, and when the micro-servitization reuse of the operators in the AI model is realized, the parallel operation of massive target data may be implemented to effectively improve the overall big data processing efficiency.

Based on the above explanation of the first micro-service and the second micro-service, in the embodiment of the present disclosure, in the process of training the AI model using the target data to process the target data, the first micro-service obtained by performing the micro-servitization processing in advance can be used to implement data segmentation on the target data to obtain a plurality of types of sub-data.

The type may specifically be an audio type, an image type, a text type, etc., which is not limited herein.

For example, assuming that the target data is massive video data, the first micro-service is used to implement data segmentation on the target data to obtain a plurality of types of sub-data. Specifically, audio type of voice data, image type of picture data, or text type of text data are separated from the video data, the voice data maybe a segment of voice in video data, picture data may a picture corresponding to each image frame converted from a video image, text data can be the text included in the video data, which is not limited herein.

For another example, assuming that the target data is massive document data, the first micro-service is used to implement data segmentation on the target data to obtain a plurality of types of sub-data. Specifically, pictures and texts can be separated from each document data, which is not limited herein.

The above-mentioned audio type of voice data, image type of picture data, or text type of text data from each video data may be called as sub-data.

After the first micro-service is used to implement data segmentation on the target data to obtain a plurality of types of sub-data, subsequent steps can be triggered.

S103: a plurality of second micro-services are used to process the plurality of types of sub-data to obtain a plurality of data processing results respectively corresponding to the plurality of second micro-services, in which each second micro-service corresponds to one type of sub-data.

After the first micro-service is used to implement data segmentation on the target data to obtain a plurality of types of sub-data, a plurality of second micro-services obtained in advance by performing the micro-servitization processing can be loaded to process the corresponding types of sub-data respectively, to obtain the plurality of data processing results corresponding to the second micro-services.

Since the second micro-service is obtained by performing the micro-servitization processing on the second operator that performs algorithmic processing on the preprocessed data, and the performing algorithmic processing on the preprocessed data includes implementing face recognition, human body recognition, OCR on the preprocessed target data, in the embodiments of the present disclosure, different second micro-services have different algorithm processing logics, and different algorithm processing logics can be adapted to the processing of the corresponding type of sub-data.

For example, the second micro-service having the algorithm processing logic for audio data can be used to process audio data, the second micro-service having the algorithm processing logic for image data can be used to process image data, and the second micro-service having the algorithm processing logic for text data can be used to process text data, which is not limited herein.

In the embodiments of the present disclosure, in the actual application process, the algorithm processing logic corresponding to the second micro-service is not limited to the above, and can also be any other possible algorithm processing logic, such as classification inference, classification recognition of the video data, and recognition of a target object in video data. In addition, the second micro-service can also be customizable, that is, various second micro-services obtained by performing the micro-servitization processing in advance can be adaptively loaded according to the actual data processing requirements, which is not limited herein.

When a plurality of second micro-services are used to process corresponding types of sub-data, specifically a plurality of second micro-services may be used to process corresponding types of sub-data based on parallel data processing, so as to improve overall data processing efficiency.

S104: the plurality of data processing results are combined to obtain a target data processing result.

When a plurality of second micro-services are used to process corresponding types of sub-data respectively, data processing results corresponding to each second micro-service can be obtained.

The data processing results are, for example, classification inference results, classification recognition results, face detection results, etc.

Then, a plurality of data processing results can be combined to obtain the target data processing result. For example, the above classification inference results, classification recognition results, and face detection results can be combined in a weighted manner, or the classification inference results, the classification recognition results and the face detection results are input into a pre-trained combination model, and combined by the pre-trained combination model, the combined results is used as the target data processing result.

For example, if the data processing result is the classification inference result, the classification recognition result, the face detection result, the target data processing result can be a classification label of the video data, and the classification label can obtained based on the classification inference result, classification recognition result, and face detection result, which is not limited herein.

After combining a plurality of data processing results to obtain the target data processing result, the data processing results can be directly provided to an external device or an application program that plays video data for subsequent use.

In this embodiment, by acquiring target data, the first micro-service is used to implement data segmentation on the target data to obtain a plurality of types of sub-data, and a plurality of second micro-services are used to process corresponding types of sub-data, respectively, so as to obtain a plurality of data processing results corresponding to the second micro-services, and combine the plurality of data processing results to obtain the target data processing result, because the micro-services with various algorithm functions are efficiently configured and combined, dedicated data processing is implemented on the target data to obtain corresponding data processing result, and various data processing results are combined, which can effectively improve the combination and adaptation performance of micro-services in the data processing process, and effectively improve data processing efficiency and effect.

Figure 2:
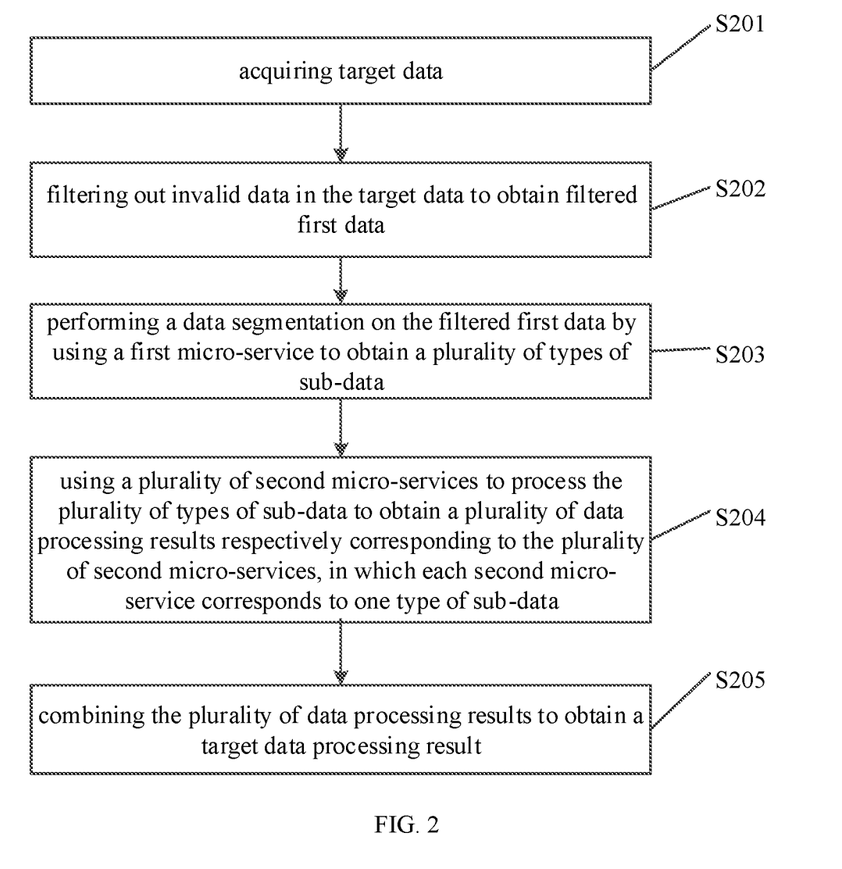
FIG. 2 is a flowchart of a data processing method according to a second embodiment of the present disclosure.

FIG. 2 is a schematic diagram of a second embodiment of the present disclosure.

As shown in FIG. 2, the data processing method includes the following steps.

S201: target data is acquired.

The description of S201 may be specifically refer to the above embodiment, and details are not described herein again.

S202: invalid data in the target data is filtered out to obtain filtered first data.

After acquiring the target data, the invalid data in the target data can be filtered out to obtain the filtered first data, the invalid data may be specifically the noise data among the target data, or low quality data. For example, the target data may be processed by the micro-service corresponding to the denoising algorithm in advance to filter out the invalid data in the target data, or the first micro-service is provided by a function of denoising data, so that the first micro-service is used to filter out the invalid data in the target data, and after the invalid data is filtered out, the remaining target data is used as the first data, which is not limited herein.

S203: a data segmentation is performed on the filtered first data by using a first micro-service to obtain a plurality of types of sub-data.

The above-described invalid data in the target data is filtered out to obtain the filtered first data, and the first micro-service can be used to perform the data segmentation on the filtered first data to obtain a plurality of types of sub-data.

In this embodiment, since the invalid data in the target data is filtered out in advance to obtain the filtered first data, the second micro-service is load to directly process the first data, thereby effectively improving the data processing accuracy.

S204: a plurality of second micro-services are used to process the plurality of types of sub-data to obtain a plurality of data processing results respectively corresponding to the plurality of second micro-services, in which each second micro-service corresponds to one type of sub-data.

S205: the plurality of data processing results are combined to obtain a target data processing result.

The description of S204-S205 can be specifically referred to the above embodiment, and details are not described herein again.

Figure 3:
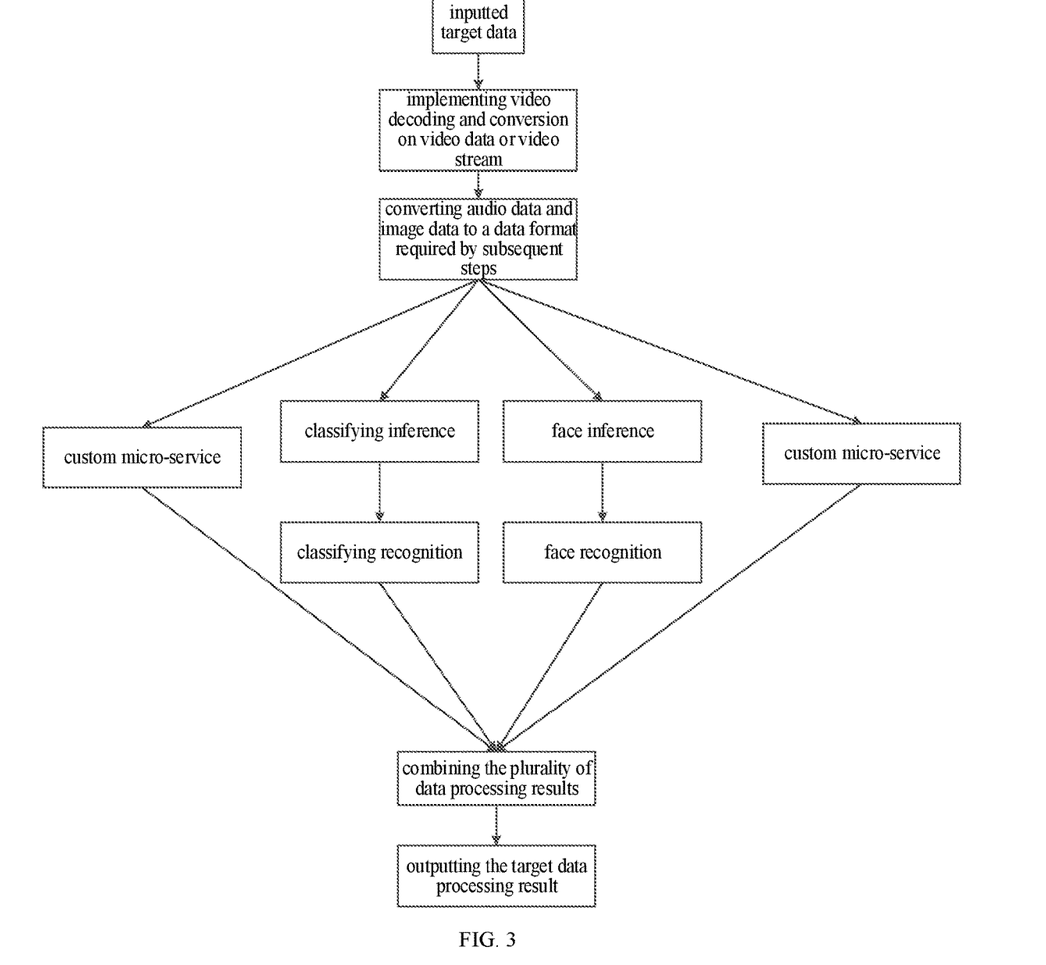
FIG. 3 is a schematic diagram of a data processing method in an embodiment of the present disclosure.

This embodiment gives a specific application example of a data processing method. FIG. 3 is a schematic diagram of a data processing method in an embodiment of the present disclosure, in which the inputted target data can be a mass video data or a video stream that supports Real Time Messaging Protocol (RTMP) live broadcast, the first micro-service may be called to implement video decoding and conversion on the video data or video stream, the video data or the video stream are processed to image data, audio data, and then the image data, audio data are converted to a data format required by subsequent steps, the inference service provided by the second micro-service (specifically, classifying inference, face recognition, human identification, OCR, optical character identification) is triggered and loaded, or, any other possible custom micro-service can also be loaded, so as to obtain data processing results corresponding to each second micro-service (for example, using a face recognition), and then the plurality of data processing results are combined to obtain the target data processing result, and the target data processing result is outputted, for example, a video stream with features such as label (human behavior, character name).

In this embodiment, by acquiring the target data, the first micro-service is used to implement data segmentation on the target data to obtain a plurality of types of sub-data, and a plurality of second micro-services are used to process the corresponding type of sub-data to obtain a plurality of data processing results corresponding to the second micro-services, and the plurality of data processing results are combined to obtain the target data processing result. Since the micro-services with various algorithm functions are efficiently configured and combined, dedicated data processing is implemented on the target data to obtain corresponding data processing result, and various data processing results are combined, which can effectively improve the combination and adaptation performance of micro-services in the data processing process, and effectively improve data processing efficiency and effect. Since the invalid data in the target data is filtered out in advance to obtain the filtered first data, the second micro-service is load to directly process the first data, thereby effectively improving the data processing accuracy FIG. 4 is a schematic diagram of a third embodiment of the present disclosure.

Figure 4:
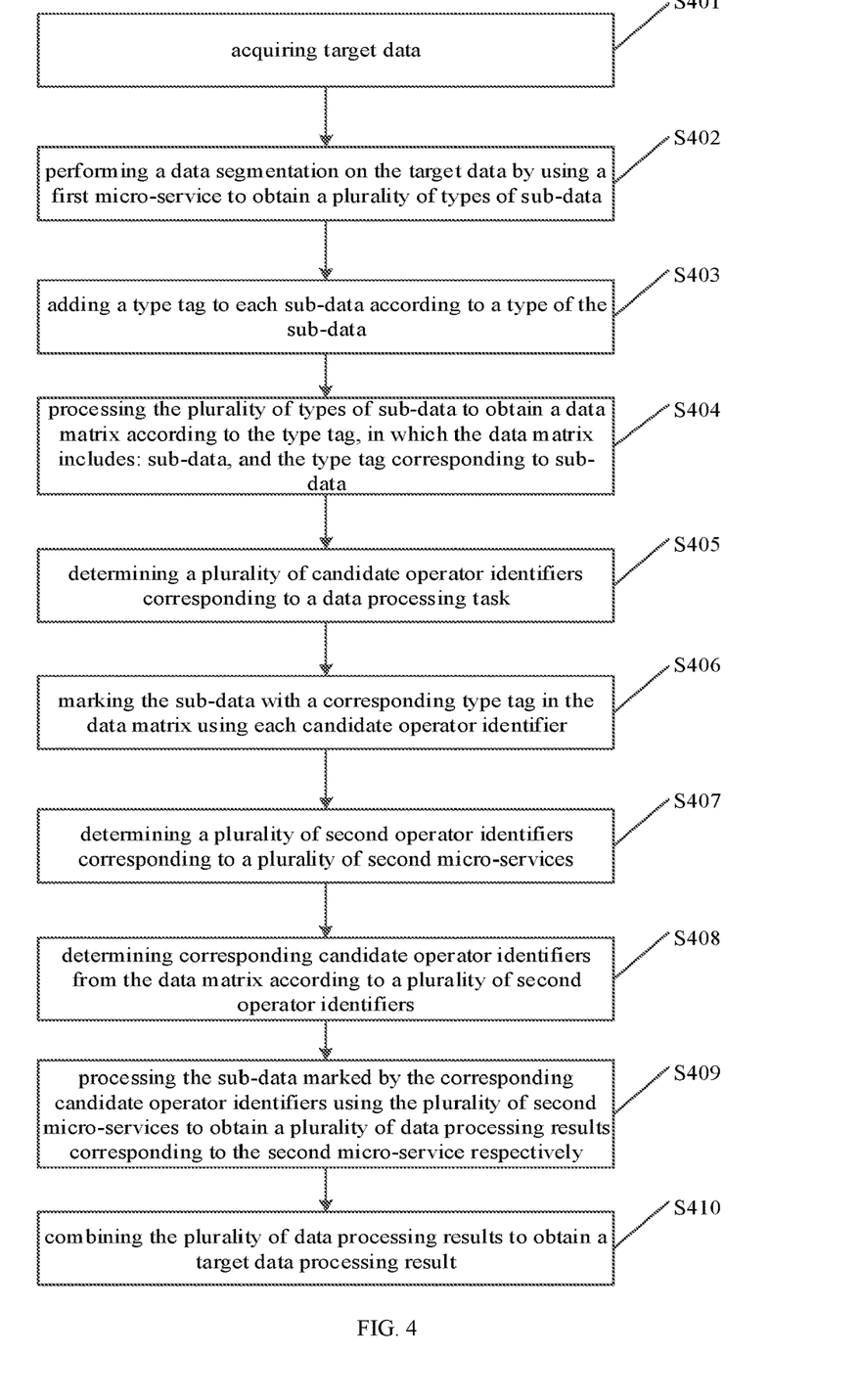
FIG. 4 is a flowchart of a data processing method according to a third embodiment of the present disclosure.

As shown in FIG. 4, the data processing method includes the following steps.

S401: target data is acquired.

S402: a data segmentation is performed on the target data by using a first micro-service to obtain a plurality of types of sub-data.

Description of S401-S402 can be specifically referred to the above embodiment, and details are not described herein again.

S403: a type tag is added to each sub-data according to a type of the sub-data.

That is, in the present disclosure, after the first micro-service is used to implement data segmentation on the target data to obtain a plurality of types of sub-data, a corresponding type tag can be generated according to the type, and this type tag is used for the corresponding type of sub-data.

In the present disclosure, a type tag is added to the corresponding sub-data according to the type of sub-data, which is to assist in processing the plurality of types of sub-data to obtain a data matrix.

For example, if the audio type of audio data, image type of image data and text type of text data are separated from the respective video data, an audio type tag is added to the audio data, an image type tag is added to the image data and a text type tag is added to the text data.

S404: the plurality of types of sub-data are processed to obtain a data matrix according to the type tag, in which the data matrix includes: sub-data, and the type tag corresponding to sub-data.

After adding a type tag to sub-data according to a type of the sub-data, a plurality of types of sub-data may be processed to obtain a data matrix according to the type tag.

The data matrix can be understood as a data set of a shared matrix form, where the shared matrix form is a linear algebraic matrix theory. In mathematics, the matrix is a set of data arranged in a rectangular array, which is equivalent to a specification of data. The efficient operation, conversion, transformation, and other operations of data processing may be assisted by the data set of the shared matrix form.

In this embodiment, a plurality of types of sub-data are processed to obtain a data matrix according to the type tag, that is, each type of sub-data is taken as a "data unit" in the data set of shared matrix form, these different types of "data units" constitutes a data matrix, and a series of subsequent data processing algorithms of the data matrix can be directly applied to the data matrix, so that in a code level corresponding to the micro-service, atom operations on the "data unit" can be directly realized.

A plurality of types of sub-data are processed to obtain a data matrix according to the type tag, such that the data matrix includes: sub-data, and the type tag corresponding to sub-data, the type tag can be used to quickly locate the corresponding type of sub-data from the data matrix during the subsequent data processing task.

In this embodiment, after the plurality of types of sub-data are to obtain as a data matrix according to the type tag, the data matrix can be backed up to obtain a plurality of backup data matrices; the plurality of backup data matrix are stored in a shared memory corresponding to the data processing device.

Assuming that a plurality of second micro-services in the present disclosure are deployed in different distributed data processing devices, each distributed data processing device can have the same shared memory. After the plurality of types of sub-data are processed to obtain the data matrix, the corresponding plurality of backup data matrices can be generated (the backup data matrix may have the same or corresponding data structure, data content as the data matrix), and then each data processing device can obtain the backup data matrix from the shared memory to perform the corresponding data operation processing.

That is, in the present embodiment, The backup processing is implemented on the data matrix to obtain a plurality of backup data matrices, the plurality of backup data matrices are stored to the shared memory corresponding to the data processing device, so that data processing method can effectively adapt to the application scenario of distributed data processing, support the lateral backup extension of the data matrix, by generating a plurality of redundant shared backup data matrices, repeated preprocessing of the target data can be effectively avoided, which effectively saves the time of data processing, and realizes the quick load of data by utilizing multi-backup advantage during subsequent data loading and reading process.

S405: a plurality of candidate operator identifiers corresponding to a data processing task are determined.

That is, when the data processing task is executed, operators corresponding to the various candidate data processing algorithms can be referred to as candidate operators, and a plurality of second operators can be at least part of the plurality of candidate operators. The data processing task may refer to data processing performed by using the plurality of second micro-services.

The candidate operator identifier can be used to uniquely identify the corresponding candidate operator, for example, the candidate operator 1 corresponds to the candidate operator identifier 1, the candidate operator 2 corresponds to the candidate operator identifier 2, the candidate operator 3 corresponds the candidate operator identifier 3, the candidate operator identifier 1 is used to uniquely identify the candidate operator 1, the candidate operator identifier 2 is used to uniquely identify the candidate operator 2, the candidate operator identifier 3 is used to uniquely identify candidate operators 3, and so on.

In this embodiment, when the second micro-service is loaded, at least part of the plurality of candidate operators are loaded, and the loaded candidate operator can be the second operator, and the second micro-service corresponding to the secondary operator is loaded to perform the corresponding data processing task.

S406: sub-data is marked with a corresponding type tag in the data matrix using each candidate operator identifier.

In this embodiment, the plurality of candidate operator identifiers corresponding to the data processing task may be determined in advance, and each candidate operator identifier is used to process each sub-data in the data matrix, and the candidate operator identifier is used as a pointer to mark the corresponding type of sub-data.

It will be understood that since each second micro-service corresponds to one type of sub-data, the second micro-service has a corresponding data algorithm processing logic with the second operator, and the second operator is determined from the plurality of candidate operators, thus the corresponding candidate operator identifier corresponds to one type, and corresponds to one type tag.

In the present embodiment, the plurality of types of sub-data can be processed to obtain a data matrix according to the type tag, and after determining a plurality of candidate operator identifiers corresponding to the data processing task, each candidate operator identifier is used to process each sub-data in the data matrix, the candidate operator is used as a pointer to mark the corresponding type of sub-data, thereby achieving normalization processing of a plurality of types of sub-data, quickly and efficiently loading and positioning the corresponding type of sub-data in the process of subsequent data processing.

Alternatively, in other embodiments, other possible ways may be employed to organize a plurality of types of sub-data to generate a data set of a corresponding form, which is not limited herein.

S407: a plurality of second operator identifiers respectively corresponding to a plurality of second micro-services are determined.

After processing a plurality of types of sub-data to obtain a data matrix according to the type tag, during the actual data processing process, the corresponding type of sub-data can be directly determined from the data matrix based on the second operator identifier corresponding to the second micro-service.

For example, it is assumed that the data matrix includes: sub-data 1, sub-data 2, sub-data 3, sub-data 4, respectively, and candidate operator identifiers are marked for each sub-data, for example, the candidate operator identifier 1 marked for sub-data 1, the candidate operator identifier 2 marked for sub-data 2, the candidate operator identifier 3 marked for sub-data 3, when the candidate operator identifies are marked for the corresponding sub-data, it can indicate that the algorithm processing logic of the candidate operator corresponding to the candidate operator identifier to process the sub-data, for example, the image processing algorithm can be used to process the image data, and the audio decoding algorithm is used to process the audio data.

S408: corresponding candidate operator identifiers are determined from the data matrix respectively according to the plurality of second operator identifiers.

After determining the plurality of second operator identifier corresponding to the plurality of second micro-services, the candidate operator identifier corresponding to the second operator identifier can be determined from the data matrix according to the plurality of second operator identifiers, so that the corresponding type of sub-data may be loaded based on the matched candidate operator identifier.

S409: the sub-data marked by the corresponding candidate operator identifiers is processed using the plurality of second micro-services respectively to obtain a plurality of data processing results respectively corresponding to the second micro-service.

In this embodiment, a plurality of second operator identifiers corresponding to the plurality of second micro-services may be first determined, and one second operator identifier can uniquely identify one corresponding second operator, it is assumed that the second operator identifier is 1, which corresponds to the candidate operator identifier 1 in the data matrix, and the sub-data marked by the candidate operator identifier 1 can be loaded and read from the data matrix, it is assumed that the second operator identifier is 2, which corresponds to the candidate operator identifier 2 in the data matrix, and the sub-data marked by the candidate operator identifier 2 can be loaded and read from the data matrix, and so on.

In the present embodiment, by determining the plurality of second operator identifiers respectively corresponding to the plurality of second micro-services, the corresponding candidate operator identifier is determined from the data matrix in accordance with the plurality of second operator identifiers, and the sub-data marked by the corresponding candidate operator identifier are processed by using the plurality of second micro-services to obtain a plurality of data processing results respectively corresponding to the plurality of second micro-services, which can effectively improve the loading and reading efficiency of the sub-data, and take into account the adaptation performance of the micro-service and data loading performance at the same time, and ensure the performance of the overall data processing.

In other embodiments of the present disclosure, if other possible ways are used to organize a plurality of types of sub-data to generate a corresponding form of data set, a loading and reading method that match the corresponding data organization mode can be used to load and read the corresponding type of sub-data, which is not limited herein.

S410: the plurality of data processing results are combined to obtain a target data processing result.

Description of S410 may be specifically referred to the above embodiment, and details are not described herein.

In another embodiment of the present disclosure, it is also possible not to store the target data, sub-data, and data processing results in the data processing, which can be interpreted as in the process of data processing, after the corresponding data are used, the corresponding data are deleted, that is, different data processing algorithm logics can use a same preprocessed backup data matrix, thus the deleting of the data does not affect the execution of other algorithm processing logic. Therefore, the data loading, transmission, and processing timeliness of each link during the data processing process can be improved to a large extent In this embodiment, by acquiring the target data, the target data is divided by the first micro-service to obtain a plurality of types of sub-data, and the plurality of second micro-services are used to process the corresponding type of sub-data respectively to obtain a plurality of data processing results respectively corresponding to the second micro-services, and the plurality of data processing results are combined to obtain the target data processing result. Since the micro-services with various algorithm functions are efficiently combined and configured, and the dedicated processing is implemented on the target data to obtain corresponding data processing results, and the data processing results are combined, which can effectively improve the combining adaptation of micro-services in the data processing process, effectively improve data processing efficiency and effect. By processing a plurality of types of sub-data to obtain a data matrix according to the type tag, and after the plurality of candidate operator identifiers corresponding to the data processing task are determined, each candidate operator identifier is used to process the various sub-data in the data matrix, the candidate operator identifier is used as a pointer to mark the corresponding type of sub-data, thereby achieving normalization processing for a plurality of types of sub-data, quickly and efficiently positioning and loading the corresponding type of sub-data. By determining the plurality of second operator identifiers respectively corresponding to the plurality of second micro-services, the corresponding candidate operator identifier is determined from the data matrix in accordance with the plurality of second operator identifiers, and the sub-data marked by the corresponding candidate operator identifier are processed by using the plurality of second micro-services to obtain a plurality of data processing results respectively corresponding to the plurality of second micro-services, which can effectively improve the loading and reading efficiency of the sub-data, and take into account the adaptation performance of the micro-service and data loading performance at the same time, and ensure the performance of the overall data processing.

Figure 5:
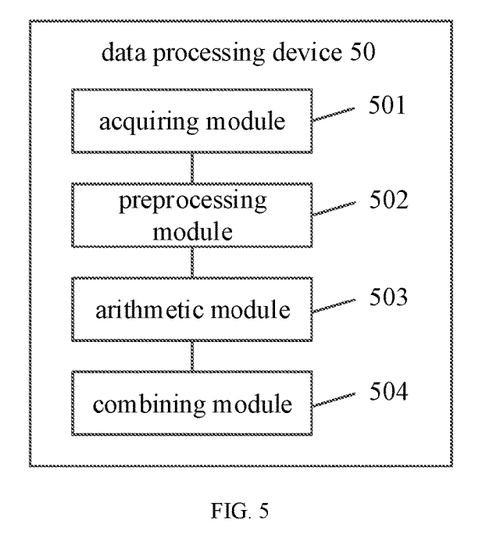
FIG. 5 is a block diagram of a data processing device according to a fourth embodiment of the present disclosure.

FIG. 5 is a schematic diagram of a fourth embodiment of the present disclosure.

As shown in FIG. 5, the data processing device 50 includes: an acquiring module 501, configured to acquire target data; a preprocessing module 502, configured to perform a data segmentation on the target data by using a first micro-service to obtain a plurality of types of sub-data; an arithmetic module 503, configured to use a plurality of second micro-services to process the plurality of types of sub-data to obtain a plurality of data processing results respectively corresponding to the plurality of second micro-services, in which each second micro-service corresponds to one type of sub-data; and a combining module 504, configured to combine a plurality of data processing results to obtain a target data processing result.

Optionally, in some embodiments of the present disclosure, the first micro-service is obtained by performing micro-servitization processing on the first operator in the AI model, and the second micro-service is obtained by performing the micro-servitization processing on the second operator in the AI model, and the first operator and the second operator are different.

Alternatively, in some embodiments of the present disclosure, the preprocessing module 502 is specifically configured to filter out invalid data in the target data to obtain filtered first data, and perform the data segmentation on the filtered first data by the first micro-service to obtain a plurality of types of sub-data.

Figure 6:
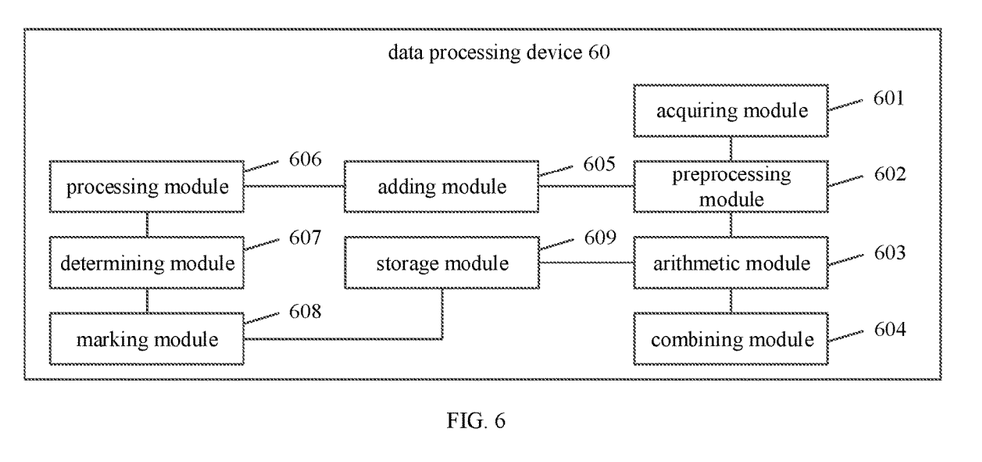
FIG. 6 is a block diagram of a data processing device according to a fifth embodiment of the present disclosure.

Optionally, in some embodiments of the present disclosure, as shown in FIG. 6, FIG. 6 is a schematic diagram according to a fifth embodiment of the present disclosure, the data processing device includes: an acquiring module 601, a preprocessing module 602, an arithmetic module 603, and a combining module 604. The data processing device 60 further includes: an adding module 605, configured to add a type tag to each sub-data according to a type of the sub-data; a processing module 606, configured to process a plurality of types of sub-data to obtain a data matrix according to the type tag, in which the data matrix includes: sub-data, and type tags corresponding to sub-data; a determining module 607, configured to determine a plurality of candidate operator identifiers corresponding to a data processing task; and a marking module 608, configured to mark the sub-data with a corresponding type tag in the data matrix using each candidate operator identifier.

Alternatively, in some embodiments of the present disclosure, the arithmetic module 603 is specifically configured to: determine a plurality of second operator identifiers corresponding to a plurality of second micro-services; determine corresponding candidate operator identifiers from the data matrix according to a plurality of second operator identifiers; and process the sub-data marked by the corresponding candidate operator identifier using the plurality of second micro-services to obtain a plurality of data processing results corresponding to the second micro-service respectively.

Alternatively, in some embodiments of the present disclosure, as shown in FIG. 6, the data processing device 60 further includes a storage module 609, configured to back up the data matrix to obtain a plurality of backup data matrices, and store the plurality of backup data matrices to a shared memory corresponding to the data processing device.

Optionally, in some embodiments of the present disclosure, the first operator is used for data preprocessing in the AI model, and the second operator is used for algorithm processing for preprocessed data in the AI model.

It will be appreciated that the data processing device 60 and the data processing device 50, the acquiring module 601 and the acquiring module 501, the preprocessing module 602 and the preprocessing module 502, the arithmetic module 603 and the arithmetic module 503, the combining module 604 and the combining module 504 in the above embodiments, can have the same functions and structures.

It should be noted that the foregoing explanation of the data processing method also applies to the data processing device of the present embodiment, and details are not described herein again.

In this embodiment, by acquiring target data, the first micro-service is used to implement data segmentation on the target data to obtain a plurality of types of sub-data, and a plurality of second micro-services are used to process corresponding types of sub-data, respectively, so as to obtain a plurality of data processing results corresponding to the second micro-services, and combine the plurality of data processing results to obtain the target data processing result, because the micro-services with various algorithm functions are efficiently configured and combined, dedicated data processing is implemented on the target data to obtain corresponding data processing result, and various data processing results are combined, which can effectively improve the combination and adaptation performance of micro-services in the data processing process, and effectively improve data processing efficiency and effect.

According to an embodiment of the present disclosure, the present disclosure also provides an electronic equipment, a readable storage medium, and a computer program product.

Figure 7:
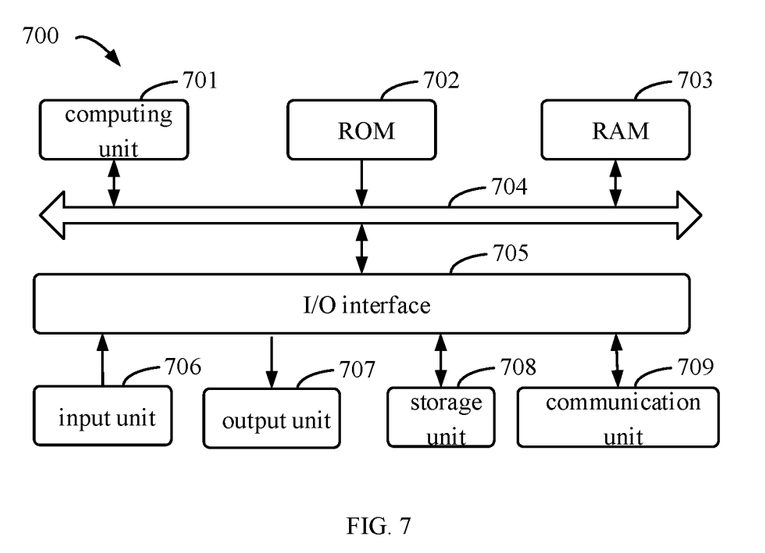
FIG. 7 is a block diagram of an electronic equipment used to implement the data processing method according to an embodiment of the present disclosure.

FIG. 7 is a block diagram of an electronic equipment used to implement a data processing method according to an embodiment of the present disclosure. Electronic equipment is intended to represent various forms of digital computers, such as laptop, desktop computers, workstation, personal digital assistants, servers, blade servers, large computers, and other suitable computers. Electronic equipment can also represent various forms of mobile devices, such as personal digital processing, cellular telephones, smart phones, wearable devices, and other similar computing devices. The components and connection relationship and functions thereof are merely examples, and are not intended to limit the implementation of the present disclosure.

As shown in FIG. 7, the equipment 700 includes a computing unit 701, which can perform a variety of appropriate action and processing based on a computer program stored in the read only memory (ROM) 702 or loaded from the storage unit 708 to the random access memory (RAM) 703. In the RAM 703, various programs and data required for the equipment 700 can also be stored. The calculation unit 701, the ROM 702, and the RAM 703 are connected to each other through a bus 704. An input/output (I/O) interface 705 is also connected to the bus 704.

The plurality of components in the equipment 700 are connected to the I/O interface 705, and include: an input unit 706, such as a keyboard, mouse, or the like, an output unit 707, such as various types of displays, speakers, or the like, a storage unit 708, such as a disk, optical disc or the like, and a communication unit 709, such as a network card, modem, wireless communication transceiver, etc. The communication unit 709 allows the equipment 700 to exchange information/data with other devices through computer networks and/or various telecommunications networks such as the Internet.

The calculation unit 701 can be a general and/or dedicated processing component having processing and computing capability. Some examples of calculation unit 701 include, but are not limited to, a central processing unit (CPU), a graphics processing unit (GPU), various dedicated artificial intelligence (AI) computing chips, various calculation units for operating machine learning model algorithms, digital signal processing (DSP), and any suitable processor, controller, micro-controller or the like. The calculation unit 701 performs the respective methods and processing described above, for example, a data processing method.

For example, in some embodiments, the data processing method can be implemented as a computer software program, which is tangibly included in a machine readable medium, such as a storage unit 708. In some embodiments, the portion or all of the computer program may be loaded and/or installed on the equipment 700 via ROM 702 and/or the communication unit 709. When the computer program is loaded into the RAM 703 and executed by the calculation unit 701, one or more steps of the data processing method described above can be performed. Alternatively, in other embodiments, calculating unit 701 can be configured to perform the data processing method by other suitable means (e.g., by means of firmware).

Various embodiments of the systems and techniques described above in the present disclosure can be implemented in digital electronic circuitry, integrated circuitry, field programmable gate array (FPGA), application specific integrated circuit (ASIC), application specific standard product (ASSP), system on chip (SOC), complex programmable logic device (CPLD), computer hardware, firmware, software, and/or a combination thereof. These various embodiments may include: implementing in one or more computer programs, which can be performed and/or interpreted on a programmable system including at least one programmable processor, the programmable processor can be a dedicated or universal programmable processor, data and instructions can be received from the storage system, at least one input device, and at least one output device, and the data and instruction can be transmitted to the storage system, the at least one input device, and at least one output device.

The program code for implementing the data processing method of the present disclosure can be written any combination of one or more programming languages. These program code can be provided to a processor or controller for a general purpose computer, a dedicated computer, or another programmable data processing device, so that the program code is executed by the processor or controller to implement the function and operation in the flowchart and/or block diagram. The program code can be entirely executed on the machine, partially executed on the machine, partially executed on the machine and partially executed on a remote machine as a stand-alone software package, or entirely executed on the remote machine or server.

In the context of the present disclosure, the machine readable medium can be a tangible medium, which may contain or store a program used for instruction execution systems, devices, or devices, or a program that can be combined with instruction execution systems, devices, or devices. The machine readable medium can be a machine readable signal medium or a machine readable storage medium. The machine readable medium can include, but are not limited to, electronic, magnetic, optical, electromagnetic, infrared, or semiconductor systems, devices, or any suitable combination thereof. More specific examples of machine readable storage medium include electrical connection based on one or more lines, portable computer disc, hard disk, random access memory (RAM), read-only memory (ROM), electrically erasable programmable read-only memory (EPROM or flash memory), fiber optic, compact disk read only memory (CD-ROM), optical storage device, magnetic storage device, or any suitable combination thereof.

In order to provide interaction with the user, the systems and techniques described herein can be implemented on a computer, the computer has a display device for displaying information to a user (e.g., a cathode ray tube (CRT) or liquid crystal display (LCD)); and a keyboard and pointing device (e.g., mouse or trackball), users can provide input to the computer through the keyboard and the pointing device. Other types of devices can also be used to provide interactions with the user; for example, feedback to the user can be any form of sensing feedback (e.g., visual feedback, audible feedback, or tactile feedback); and can be used in any form (including acoustic input, voice input, or tactile input) to receive input from the user.

The systems and techniques described herein can be implemented in a computing system including the background component (e.g., as a data server), or a computing system including an intermediate component (e.g., an application server), or a computing system including a front end component (e.g., a user computer with a graphical user interface or a web browser, the user can interact with the system and technology described herein through the graphical user interface or the web browser), or a computer system including any combination of the background components, intermediate components, or front end components. The components of the system can be connected to each other by digital data communication (e.g., communication network) of any form or medium. Examples of the communication network include: LAN, WAN, Internet and block chain networks.

The computer system can include clients and servers. Clients and servers are generally away from each other and are usually interacting over a communication network. The relationship between the client and the server is generated by computer program running on the corresponding computer and having the client-server relationship with each other. The server can be a cloud server, also known as a cloud computing server or a cloud host, which is a host product in a cloud computing service system, so as to solve the defect of high management difficulty and weak business scales in the traditional physical host and VPS service (Virtual Private Server, or VPS in brief). The server can also be a server of a distributed system, or a server that combines the block chains.

It should be understood that the various forms of flows shown above can be used, the steps may be reordered, increased or deleted. For example, the steps described in the present disclosure can be performed in parallel, or may be sequentially performed, or may be performed in other order, as long as the technical solution disclosed in the present disclosure may be achieved, which is not limited herein.

The above specific embodiments are not to limit the scope of the present disclosure. It will be apparent to those skilled in the art that various modifications, combinations, sub-combinations, and replacement can be made according to design requirements and other factors. Any modification, equivalent replacement and improvement within the spirit and principles of the present disclosure should be included within the scope of this disclosure.

What is claimed is:

1. A data processing method, comprising:
acquiring target data;
performing a data segmentation on the target data by using a first micro-service to obtain a plurality of types of sub-data;
adding a type tag to each sub-data according to a type of the sub-data;
processing the plurality of types of sub-data to obtain a data matrix according to the type tag, wherein the data matrix includes: the sub-data, and the type tag corresponding to the sub-data;
determining a plurality of candidate operator identifiers corresponding to a data processing task;
marking the sub-data with respective type tag in the data matrix using each candidate operator identifier, wherein each candidate operation identifier corresponds to one type tag;
determining, from the plurality of candidate operator identifiers, a plurality of second operator identifiers respectively corresponding to a plurality of second micro-services, wherein each second micro-service corresponds to one type of sub-data;
determining candidate operator identifiers respectively corresponding to the plurality of second operator identifiers from the data matrix respectively according to the plurality of second operator identifiers;

processing the sub-data marked by the candidate operator identifiers using the plurality of second micro-services respectively to obtain a plurality of data processing results respectively corresponding to the second micro-service;

combining, by a pre-trained combination model, the plurality of data processing results to obtain a target data processing result; and providing the target data processing result to an application program that plays video data for subsequent use.

2. The method according to claim 1, wherein the first micro-service is obtained by performing micro-servitization processing on a first operator in an artificial intelligence (AI) model, and the second micro-service is obtained by performing the micro-servitization processing on a second operator in the AI model, and the first operator and the second operator are different.

3. The method according to claim 1, wherein performing the data segmentation on the target data by using the first micro-service to obtain the plurality of types of sub-data comprises:
    filtering out invalid data in the target data to obtain filtered first data; and
    performing the data segmentation on the filtered first data by using the first micro-service to obtain the plurality of types of sub-data.

4. The method according to claim 1, wherein after processing the plurality of types of sub-data to obtain the data matrix according to the type tag, the method further comprises:
    backing up the data matrix to obtain a plurality of backup data matrices, and
    storing the plurality of backup data matrices to a shared memory corresponding to a data processing device.

5. The method according to claim 2, wherein the first operator is used for data preprocessing in the AI model, and the second operator is used for algorithm processing for preprocessed data in the AI model.

6. An electronic equipment, comprising:
    at least one processor;
    a memory connected to the at least one processor;
    wherein the memory stores instructions performed by the at least one processor, the instructions are performed by the at least one processor to implement the data processing method, comprising:
    acquiring target data;
    performing a data segmentation on the target data by using a first micro-service to obtain a plurality of types of sub-data;
    adding a type tag to each sub-data according to a type of the sub-data;
    processing the plurality of types of sub-data to obtain a data matrix according to the type tag, wherein the data matrix includes: the sub-data, and the type tag corresponding to the sub-data;
    determining a plurality of candidate operator identifiers corresponding to a data processing task;
    marking the sub-data with respective type tag in the data matrix using each candidate operator identifier, wherein each candidate operation identifier corresponds to one type tag;
    determining, from the plurality of candidate operator identifiers, a plurality of second operator identifiers respectively corresponding to a plurality of second micro-services, wherein each second micro-service corresponds to one type of sub-data;

determining candidate operator identifiers respectively corresponding to the plurality of second operator identifiers from the data matrix respectively according to the plurality of second operator identifiers;

processing the sub-data marked by the candidate operator identifiers using the plurality of second micro-services respectively to obtain a plurality of data processing results respectively corresponding to the second micro-service;

combining, by a pre-trained combination model, the plurality of data processing results to obtain a target data processing result; and providing the target data processing result to an application program that plays video data for subsequent use.

7. The electronic equipment according to claim 6, wherein first micro-service is obtained by performing micro-servitization processing on a first operator in an artificial intelligence (AI) model, and the second micro-service is obtained by performing the micro-servitization processing on a second operator in the AI model, and the first operator and the second operator are different.

8. The electronic equipment according to claim 6, wherein performing the data segmentation on the target data by using the first micro-service to obtain the plurality of types of sub-data comprises:
    filtering out invalid data in the target data to obtain filtered first data; and
    performing the data segmentation on the filtered first data by using the first micro-service to obtain the plurality of types of sub-data.

9. The electronic equipment according to claim 6, wherein the instructions are performed by the at least one processor to further implement:
    backing up the data matrix to obtain a plurality of backup data matrices, and
    storing the plurality of backup data matrices to a shared memory corresponding to a data processing device.

10. The electronic equipment according to claim 7, wherein the first operator is used for data preprocessing in the AI model, and the second operator is used for algorithm processing for preprocessed data in the AI model.

11. A non-transitory computer readable storage medium stored with computer instructions, wherein the computer instructions are executed by a computer to implement the data processing method, comprising:
    acquiring target data;
    performing a data segmentation on the target data by using a first micro-service to obtain a plurality of types of sub-data;
    adding a type tag to each sub-data according to a type of the sub-data;
    processing the plurality of types of sub-data to obtain a data matrix according to the type tag, wherein the data matrix includes: the sub-data, and the type tag corresponding to the sub-data;
    determining a plurality of candidate operator identifiers corresponding to a data processing task;
    marking the sub-data with respective type tag in the data matrix using each candidate operator identifier, wherein each candidate operation identifier corresponds to one type tag;
    determining, from the plurality of candidate operator identifiers, a plurality of second operator identifiers respectively corresponding to a plurality of second micro-services, wherein each second micro-service corresponds to one type of sub-data;

determining candidate operator identifiers respectively corresponding to the plurality of second operator identifiers from the data matrix respectively according to the plurality of second operator identifiers;

processing the sub-data marked by the candidate operator identifiers using the plurality of second micro-services respectively to obtain a plurality of data processing results respectively corresponding to the second micro-service;

combining, by a pre-trained combination model, the plurality of data processing results to obtain a target data processing result; and providing the target data processing result to an application program that plays video data for subsequent use.

12. The non-transitory computer readable storage medium according to claim 11, wherein first micro-service is obtained by performing micro-servitization processing on a first operator in an artificial intelligence (AI) model, and the second micro-service is obtained by performing the micro-servitization processing on a second operator in the AI model, and the first operator and the second operator are different.

13. The non-transitory computer readable storage medium according to claim 11, wherein performing the data segmentation on the target data by using the first micro-service to obtain the plurality of types of sub-data comprises:

filtering out invalid data in the target data to obtain filtered first data; and performing the data segmentation on the filtered first data by using the first micro-service to obtain the plurality of types of sub-data.

14. The non-transitory computer readable storage medium according to claim 11, wherein the instructions are performed by the at least one processor to further implement:

backing up the data matrix to obtain a plurality of backup data matrices, and storing the plurality of backup data matrices to a shared memory corresponding to a data processing device.

* * * * *